US011591243B2

(12) United States Patent
Pacheco et al.

(10) Patent No.: US 11,591,243 B2
(45) Date of Patent: Feb. 28, 2023

(54) INDUSTRIAL PROCESS AND SYSTEM FOR THE INACTIVATION OF LIQUID WASTE

(71) Applicant: CRISTALIA PRODUTOS QUIMICOS FARMACEUTICOS LTDA., Ponte Preta (BR)

(72) Inventors: Ogari Pacheco, Itapira (BR); Vincenzo De Sio, Itapira (BR); Marcelo Secatto, Itapira (BR); Wellington Camarotto, Itapira (BR); Marcelo Da Silva, Itapira (BR)

(73) Assignee: CRISTALIA PRODUTOS QUIMICOS FARMACEUTICOS LTDA., Ponte Preta (BR)

( * ) Notice: Subject to any disclaimer, the term of this patent is extended or adjusted under 35 U.S.C. 154(b) by 0 days.

(21) Appl. No.: 17/417,031

(22) PCT Filed: May 22, 2019

(86) PCT No.: PCT/BR2019/050185
§ 371 (c)(1),
(2) Date: Jun. 21, 2021

(87) PCT Pub. No.: WO2020/124180
PCT Pub. Date: Jun. 25, 2020

(65) Prior Publication Data
US 2022/0041479 A1   Feb. 10, 2022

(30) Foreign Application Priority Data

Dec. 21, 2018   (BR) .................... BR1020180769391

(51) Int. Cl.
*C02F 1/76* (2006.01)
*C02F 1/00* (2023.01)
(Continued)

(52) U.S. Cl.
CPC ............... *C02F 1/76* (2013.01); *C02F 1/004* (2013.01); *C02F 1/008* (2013.01);
(Continued)

(58) Field of Classification Search
None
See application file for complete search history.

(56) References Cited

U.S. PATENT DOCUMENTS 4,626,453 A * 12/1986 Klotz ...................... B05D 7/16
106/14.21
2016/0045841 A1 * 2/2016 Kaplan .................. B01D 53/48
429/49

FOREIGN PATENT DOCUMENTS

CN   105084517 A   11/2015
CN   105858762 A    8/2016
(Continued)

OTHER PUBLICATIONS

International Search Report and Written Opinion of the International Searching Authority for related International Application No. PCT/BR2019/050185, dated Jul. 26, 2019, 8 pages.

*Primary Examiner* — Richard C Gurtowski
(74) *Attorney, Agent, or Firm* — Ditthavong, Steiner & Mlotkowski

(57) ABSTRACT

The present invention refers to an industrial process and system that is efficient and advantageous for inactivation of liquid wastes contaminated by mutagenic, genotoxic and/or teratogenic substances arising from high potency APIs production using inactivation chemical agents and excluding ozone, heat or UV light source.

23 Claims, 4 Drawing Sheets

(51) Int. Cl.
    *C02F 101/30* (2006.01)
    *C02F 103/34* (2006.01)
(52) U.S. Cl.
    CPC .. *C02F 2101/305* (2013.01); *C02F 2103/343* (2013.01); *C02F 2201/005* (2013.01)

(56) References Cited

FOREIGN PATENT DOCUMENTS

| | | |
|---|---|---|
| CN | 205528144 U | 8/2016 |
| EP | 3044173 B1 | 11/2017 |
| JP | 2016195978 A | 11/2016 |
| WO | 2006069008 A1 | 6/2006 |
| WO | 2020124180 A1 | 6/2020 |

\* cited by examiner

INDUSTRIAL PROCESS AND SYSTEM FOR THE INACTIVATION OF LIQUID WASTE

CROSS-REFERENCES TO RELATED APPLICATIONS

This application claims priority from PCT Application Serial No. PCT/BR2019/050185, entitled "Industrial Process and System for the Inactivation of Liquid Waste," filed on May 22, 2019, the contents of which are hereby incorporated herein in their entirety by this reference.

FIELD OF THE INVENTION

The present invention refers to an industrial process and system for the inactivation of liquid waste contaminated by mutagenic, genotoxic and/or teratogenic substances raised from the production of High Potency Active Pharmaceutical Ingredients (HPAPIs) which uses chemical agents to inactivation and excludes UV light, heat or ozone sources.

BACKGROUND OF THE INVENTION

The industrial liquid wastes constituted of waste water and/or solvent solutions contaminated by mutagenic, genotoxic and/or teratogenic substances are hazardous wastes that should be treated with particular care in order to avoid their spread in the environment.

The liquid wastes containing these hazardous substances are usually disposed by incineration, in which occurs complete degradation of toxic organic compounds and generating carbon dioxide and water. However, incineration is a very expensive method to treat liquid wastes, especially water, which requires expensive and sophisticated equipment and, in addition, is a destructive method that does not allow solvent or water recovery.

Inactivation is a pre-treatment for chemical and pharmaceutical industry liquid wastes contaminated with mutagenic, genotoxic and/or teratogenic substances. Inactivation is to treat the contaminated liquid waste with heat, ultraviolet light, chemical agents or other agents in order to convert the hazardous substance into a less toxic substance, eliminating the teratogenic, mutagenic and genotoxic activity of industrial wastes before going to secondary treatments. By inactivation and reduction of total organic carbon, industrial solvents can be recovered by distillation, and the water can be used again or even returned to the environment.

Heat and ultraviolet light treatment are not general and efficient methods to inactivate an organic compound as the molecule must be very sensitive to temperature and luminosity, respectively.

Ozone is a method that can be used for inactivation, however it is not considered as an efficient one for any kind of compounds. Beside this, it usually needs expensive technologies, such as specific sensors, ozone generator and neutralizer to compose the system. In addition, ozone has a very high-volume limitation, as it needs a large column to achieve bubbling ozone for inactivation.

These processes present technical and/or economic results that are not always satisfactory. In addition, in many cases, the use of these techniques has been shown to be inadequate and/or infeasible, especially when there is a large volume of contaminated waste, either also because the inactivation is not complete and/or inactivation time is high.

The chemical treatment is considered a general method because it is possible to find an appropriate inactivation agent for each compound, so it is efficient for every kind of contaminated solutions and solvents containing mutagenic, genotoxic and/or teratogenic compounds. Beside this, there are no volume limitation since a tank with appropriate volume can be used to carry out the chemical reaction. The inactivation chemical agents are not expensive, the process can be easily controlled and it is a non-destructive method.

However, industrial inactivation is very challenging, since it needs a plant that considers the specific inactivation of that hazardous substance, as well as the contaminated solution or solvent that can be flammable and/or explosive. In addition, features such as contaminant concentrations, time and materials for pipelines, tanks and utilities should be rigorously evaluated to plan a viable and economic system.

Fernández et al. describe an industrial inactivation system for wastewater originating from cytostatic production, such as 5-fluorouracil, methotrexate, doxorubicin and cytarabine, using ozone as oxidation agent [L. A. Fernández, E. Veliz, I. Hernández, C. Pérez, L. Garcia Vivó, S. Padrón, R. Pérez Rey, M. Bataller. Pharmaceutical Wastewater Ozonation at Industrial Scale. 17th Ozone World Congress, Strasbourg, France. August 2005]. In such system, 1200 liters of wastewater need to be inactivated, but the inactivation column has only 350 liters, which means that, although the inactivation is fast for molecules exemplified above, the process needs to be repeated 3 or 4 times to inactivate all waste.

The document WO2010046510 describes a cytostatic and pharmaceutical waste treatment for organic molecule inactivation and an equipment to carry out this process. The equipment includes two different and independent parts: solid waste reduction mill and treatment plant. The technology mentions two oxidation steps, one of then simultaneously to milling and another after the liquid waste extraction. However, there are no details about the oxidation process for hazardous substances inactivation.

The document WO2014100177 describes a compact system and a method for pharmaceutical waste treatment at lab scale. The system is proposed to be placed close to the disposal of pharmaceutical wastes, for example, under a skin of laboratory or hospital, so, it is not feasible for industrial application. This technology is intended to small waste volumes and involves longer APIs inactivation.

Despite the approaches of the state of the art, it appears that there is a need for an industrial system for inactivation of large volumes of liquid wastes contaminated by genotoxic, mutagenic and/or teratogenic substances arising from high potency APIs production, as described and claimed herein.

SUMMARY OF THE INVENTION

The present invention provides, according to a first embodiment, an industrial system for inactivation of liquid wastes contaminated by mutagenic, genotoxic and/or teratogenic substances arising from high potency APIs production, comprising the following components:

(a) Closed pipeline (30) which displaces under control the contaminated liquid waste from a containment box of the production plant to inside of two storage tanks (1) and (2);

(b) Storage tanks (1) and (2) made of refractory steel set to receive contaminated liquid wastes;

(c) Mechanical filter (40), placed between storage tanks (1) and (2) and inactivation tanks (3) and (4), in order to retain solid wastes or particles arising from the production process or decantation;

(d) Inactivation tanks (3) and (4) made of refractory steel set to receive contaminated liquid wastes and the chemical agent(s), where inactivation process is carried out;

(e) Tanks (5), (6), (7) and (8) made of polypropylene fiber set to receive inactivation chemical agents by manual loading;

(f) Collector box (60) of possible leakage of contaminated or partially inactivated liquid wastes;

(g) Collector tanks (9), (10), (11) and (12) of inactivated liquid waste comprising organic solvent solutions, and pipeline (31) to transfer inactivated liquid waste comprising water content ≥80% to a chemical and biological treatment plant;

wherein the mentioned storage and inactivation tanks are kept under inert atmosphere and reduced pressure, and the system is closed.

According to a second embodiment, the present invention provides an industrial process for inactivation of liquid wastes contaminated by mutagenic, genotoxic and/or teratogenic substances arising from high potency APIs production using the mentioned industrial system and comprising the following steps:

(a) Transferring the contaminated liquid waste arising from high potency APIs production to storage tanks (1) and (2);

(b) Pumping the contaminated liquid waste to inactivation tanks (3) and (4) passing through a mechanical filter (40) in order to retain solid wastes or particles arising from the production process or decantation;

(c) Loading tanks (5), (6), (7) and/or (8) with inactivation chemical agents appropriate to the high potency API(s) to be inactivated;

(d) Pumping a calculated amount of at least one inactivation chemical agent to inactivation tanks (3) and (4);

(e) Carrying out the chemical reaction between at least one inactivation chemical agent and the contaminated liquid waste inside inactivation tanks (3) and (4);

(f) Collecting sample of the inactivated liquid waste and confirm inactivation through physico-chemical and mutagenic tests.

(g) Pumping the inactivated liquid waste to the collector tanks (9), (10), (11) and (12), when comprising organic solvent solutions, or to the chemical and biological treatment plant, when comprising water content ≥80%;

The features of the present invention are detailed hereinafter.

DETAILED DESCRIPTION OF THE INVENTION

According to one aspect of the invention, an industrial system for inactivation of liquid wastes contaminated by mutagenic, genotoxic and/or teratogenic substances arising from high potency APIs production is provided.

The term "liquid wastes" is defined, within the scope of this invention, as comprising organic solvent solutions and/or waste water arising from high potency active pharmaceutical ingredients (HPAPIs) production.

The term "mutagenic substances" is defined, within the scope of this invention, as substances that, when exposed to cells, are able to induce mutation, or in other words, a damage in DNA molecule that is not repaired in cell replication and is passed to the following generations.

The term "genotoxic substances" is defined, within the scope of this invention, as substances that have affinity to interact with DNA, which is not necessarily an evidence of health hazardous, however they are potentially mutagenic or carcinogenic, particularly that one able to create genetic mutation that can contribute to tumor development.

The term "teratogenic substances" is defined, within the scope of this invention, as substances that are able to produce damage to the embryo or fetus during pregnancy. These damages can be reflected as early loss of pregnancy, malformations or functional changes (growth retardation, for example), or neurobehavioural disorders, as intellectual disability.

The term "high potency APIs" is defined, within the scope of this invention, as active pharmaceutical ingredients that generate high pharmacological effect even in low doses, or in other words, that have a narrow therapeutic window. We can exemplify high potency APIs as: cytostatic, hormones, among others.

Figure 1:
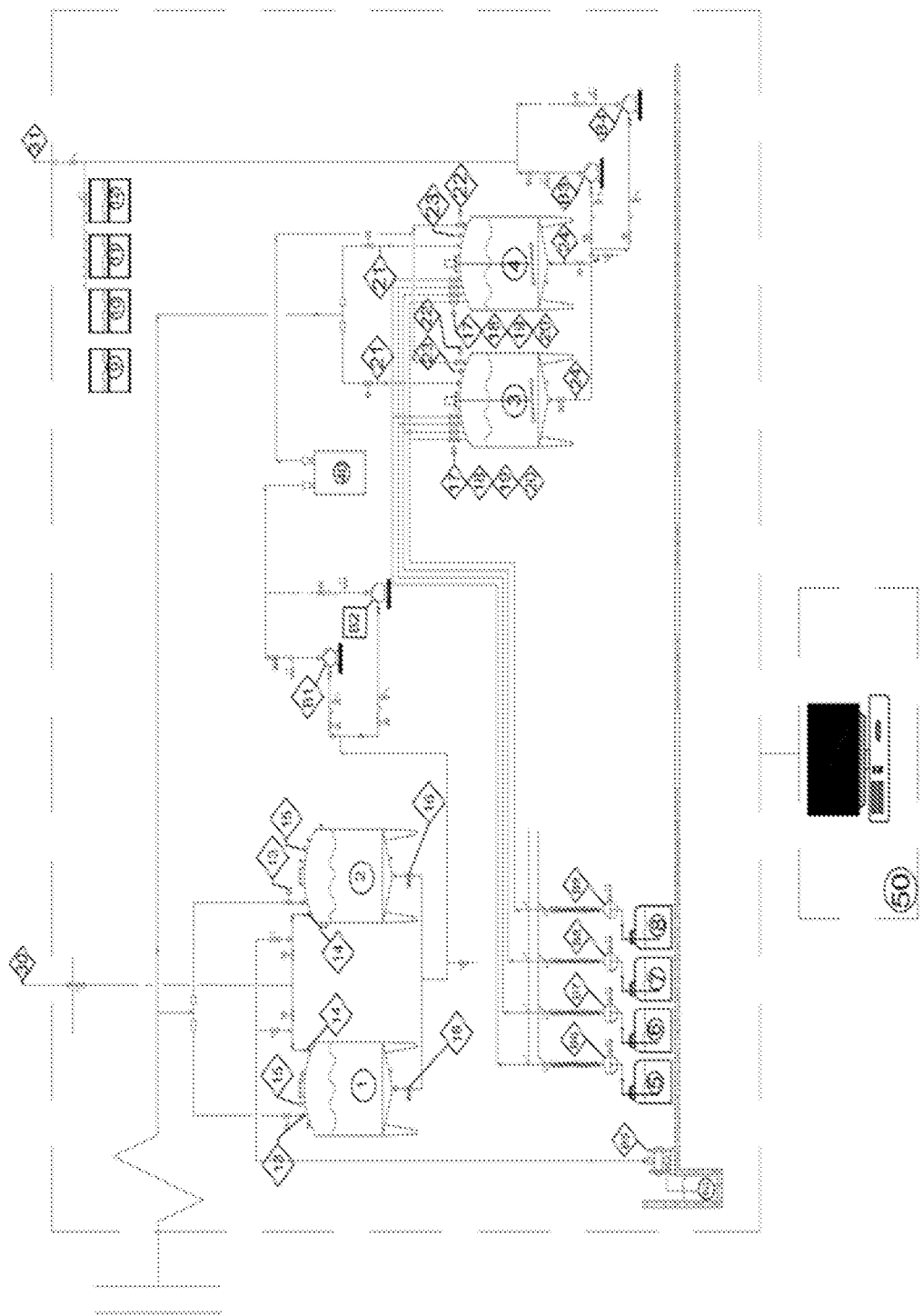
FIG. 1 illustrates the industrial system simplified flowchart.

FIG. 1 illustrates the industrial system of this invention for inactivation of liquid wastes contaminated by mutagenic, genotoxic and/or teratogenic substances arising from high potency APIs production, which comprises the following components:

(a) Closed pipeline (30) which displaces under control the contaminated liquid waste from a containment box of the production plant to inside of two storage tanks (1) and (2);

(b) Storage tanks (1) and (2) made of refractory steel set to receive contaminated liquid wastes;

(c) Mechanical filter (40), placed between storage tanks (1) and (2) and inactivation tanks (3) and (4), in order to retain solid wastes or particles arising from production process or decantation;

(d) Inactivation tanks (3) and (4) made of refractory steel set to receive contaminated liquid wastes and chemical agent(s), where the inactivation process is carried out;

(e) Tanks (5), (6), (7) and (8) made of polypropylene fiber set to receive inactivation chemical agents by manual loading;

(f) Collector box (60) of possible leakage of contaminated or partially inactivated liquid wastes;

(g) Collector tanks (9), (10), (11) and (12) of inactivated liquid waste comprising organic solvents and pipeline (31) to transfer the inactivated liquid waste comprising water content ≥80% to a chemical and biological treatment plant;

wherein the mentioned storage and inactivation tanks are kept under inert atmosphere and reduced pressure, and the system is closed.

The various items that form the invention's inactivation system will be detailed below based on FIG. 1.

The closed pipeline (30) displaces under control the contaminated liquid waste from a containment box of the production plant to inside of two tanks (1) and (2). Pipeline (30) is made of double containment pipes (jacketed pipeline)

and material that presents good or excellent strength to various solvents, such as Teflon, polyvinyl chloride (PVC), polypropylene homopolymer (PPH), among others, in order to avoid deterioration and leakage of contaminated waste.

The inactivation system is kept under inert atmosphere in order to avoid explosions. The inertization of the system is carried out with inert gas, which can be argon, nitrogen or any other gas that presents these properties. Preferably, the inert gas is nitrogen. Once inertized, the system remains in this condition and it is not necessarily continued addition of inert gas because the system is closed.

The storage tanks (1) and (2) are made of refractory steel and comprise: i) at the top, two inputs, one for nitrogen (13) and the other one (14) for the contaminated liquid waste, and an air output (15) for atmospheric control, ii) at the bottom, one output for the liquid waste (16) to inactivation tanks, and iii) control valves.

The two inactivation tanks (3) and (4) comprise: i) at the top: six inputs, four of them (17), (18), (19) and (20) for inactivation chemical agents, one for nitrogen (21) and the other one (22) for the contaminated liquid waste, and one air output (23) for atmospheric control, ii) at the bottom, one output for the inactivated liquid, and iii) control valves.

The capacity of tanks (1), (2), (3) and (4) can vary from 50 L to 1000 L each one. Preferably, these tanks have a capacity of 1000 L each one.

The tanks (5), (6), (7) and (8) are made of polypropylene fiber and are set to receive the inactivation chemical agents by manual loading. Their capacity can vary from 5 L to 50 L. Preferably, these tanks have a capacity of 50 L each one.

The inactivation system also comprises two centrifugal pumps (B1) and (B2) to pump the contaminated liquid waste in controlled amount to the inactivation tanks (3) and (4), passing through a mechanical filter (40) in order to retain solid wastes or particles arising from the process or decantation that occurs in the storage tanks (1) and (2).

The inactivation system additionally comprises four pneumatic metering pumps (B6), (B7), (B8) and (B9) to pump the inactivation agent in controlled amount to the mentioned inactivation tanks.

The inactivation system additionally comprises two centrifugal pumps (B3) and (B4) to pump the inactivated liquid waste in controlled amount to collector tanks (9), (10), (11) and (12) when comprising organic solvent solutions, or to the chemical and biological treatment plant when comprising water content 80%, through the pipeline (31).

The inactivation system additionally comprises a pneumatic pump (B5) to pump the liquid waste in controlled amount from the leakage collector box (60) to mentioned storage tanks (1) and (2).

The inactivation system of the present invention additionally comprises an automated control system (50) that allows to monitor and control the liquid waste level in the tanks, valves and pumps performance, as well all system's utilities, such as compressed air, nitrogen, in order to provide security to the system's operator.

The contaminated liquid waste comprises organic solvent solutions and/or waste water containing mutagenic, genotoxic and/or teratogenic substances arising from high potency APIs production, which includes imatinib-mesylate, bortezomib, decitabine, sunitinib malate, temozolomide and zoledronic acid, but is not limited to them.

The inactivation chemical agents are selected based on the mutagenic, genotoxic and/or teratogenic substance that one wants to inactivate. The most usual ones are the strong inorganic oxidant agents such as sodium hypochlorite (NaOCl), hypochlorous acid (HClO), hydrogen peroxide ($H_2O_2$), potassium permanganate ($KMnO_4$) or Fenton's reagent ($Fe_2^{+}+H_2O_2$), but it is not limited to them. Inactivation can also be performed by acids such as hydrobromic acid (HBr); bases, such as sodium hydroxide (NaOH), or even water, depending on the compound to be inactivated.

The inactivation chemical agent used in the inactivation system of this invention is a strong inorganic oxidant, an acid, a base, water or mixtures thereof.

Oxidant agent is preferably selected from the group consisting of sodium hypochlorite, hypochlorous acid, hydrogen peroxide, potassium permanganate and Fenton's reagent, but it is not limited to them.

Acid is hydrobromic acid and base is sodium hydroxide.

The structure of the inactivation system was built with strong ventilation and all utilities and equipment inside the building were designed to comply with ATEX Zone 2 IIB T4 (classification of explosion-proof equipment).

Finally, if a leakage occurs, organic solvent solutions and waste water contaminated or partially inactivated are recovered in a collector box (60) and can be pumped to storage tanks in order to be inactivated again.

According to another aspect of this invention, an industrial process is provided in order to inactivate liquid waste contaminated by mutagenic, genotoxic and/or teratogenic substances arising from high potency APIs production using the industrial system proposed and represented in FIG. 1, which comprises the following steps:

(a) Transferring the contaminated liquid wastes arising from high potency APIs production to storage tanks (1) and (2);

(b) Pumping the contaminated liquid wastes to inactivation tanks (3) and (4) passing through a mechanical filter (40) in order to retain solid wastes or particles arising from the production process or decantation;

(c) Loading tanks (5), (6), (7) and/or (8) with inactivation chemical agents appropriate to the high potency API(s) to be inactivated;

(d) Pumping a calculated amount of at least one inactivation chemical agent to inactivation tanks (3) and (4);

(e) Carrying out the chemical reaction between at least one inactivation chemical agent and the contaminated liquid waste inside inactivation tanks (3) and (4);

(f) Collecting sample of the inactivated liquid waste and validate inactivation by physico-chemical and mutagenic tests.

(g) Pumping the inactivated liquid waste to collector tanks (9), (10), (11) and (12) when comprising organic solvent solutions, or to the chemical treatment plants (50) when comprising water amount 80% through pipeline (31);

The contaminated liquid waste comprises organic solvent solutions and/or waste water containing mutagenic, genotoxic and/or teratogenic substances arising from high potency APIs production, which include imatinib mesylate, bortezomib, decitabine, sunitinib malate, temozolomide or zoledronic acid, but are not limited to them.

The inactivation chemical agents are selected based on the API that one wants to inactivate. The most usual ones are the strong inorganic oxidant agents such as sodium hypochlorite (NaOCl), hypochlorous acid (HClO), hydrogen peroxide ($H_2O_2$), potassium permanganate ($KMnO_4$) or Fenton's reagent ($Fe2^{+}+H_2O_2$). Inactivation can also be performed by acids, such as hydrobromic acid (HBr); bases, such as sodium hydroxide (NaOH), or even water, depending on the compound to be inactivated.

The inactivation chemical agent used in the inactivation process of the present invention is a strong inorganic oxidant, an acid, a base, water or mixtures thereof.

The oxidant agent is preferably selected from the group consisting of sodium hypochlorite, hypochlorous acid, hydrogen peroxide, potassium permanganate and Fenton's reagent, but is not limited to them.

Acid is hydrobromic acid and base is sodium hydroxide.

Since the inactivation process can be carried out in acid or basic conditions, it is not necessary to neutralize the contaminated liquid waste pH in order to perform the inactivation process.

According to one embodiment of the invention, it is possible to inactivate liquid waste that contain mutagenic, genotoxic and/or teratogenic substances arising from a single high potency API production using at least one inactivation chemical agent appropriated to the API that one wants to inactivate.

According to another embodiment of the invention, it is possible to inactivate liquid wastes containing mutagenic, genotoxic and/or teratogenic substances arising from two or more high potency APIs production using inactivation chemical agents appropriated to APIs that one wants to inactivate.

Additionally, the process comprises a secondary treatment step of the inactivated liquid waste in order to recover organic solvents by distillation or to reduce the total organic carbon for water.

The effectiveness of the inactivation process is validated by physico-chemical tests, such as HPLC analysis, and mutagenic tests, such as AMES test to confirm complete degradation of high potency API and elimination of mutagenic and genotoxic activity.

Ames Test (*Salmonella typhimurium* his reversion assay), is a short-term in vitro bioassay that detects gene mutations has been widely used for mutagenic ability determination of a wide range of chemical substances and complex mixtures, besides providing correlation with carcinogenicity.

The following examples are merely illustrative, and should be employed for a better understanding of the claimed system and process, however they should not be used in order to limit the scope of the present invention.

Example 1

Inactivation Kinetics of Imatinib Mesylate

Figure 2:
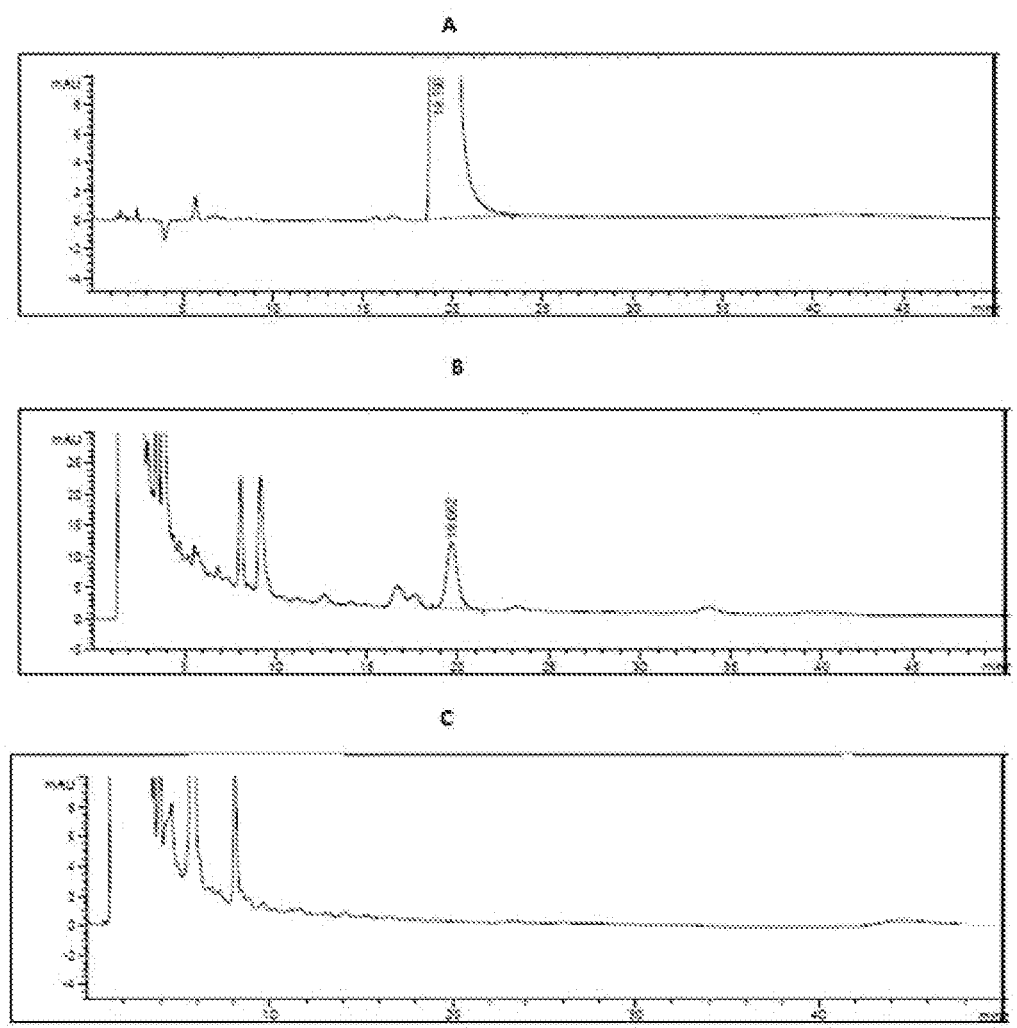
FIG. 2 illustrates the inactivation of imatinib mesylate monitored by HPLC. A (T=0); B (T=5 min) and C (T=10 min).
Figure 3:
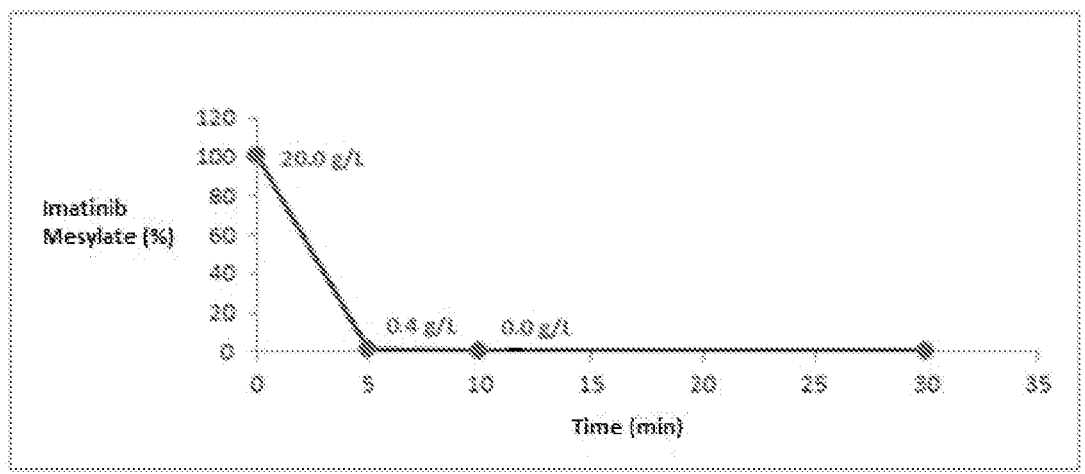
FIG. 3 illustrates inactivation kinetics of imatinib mesylate.

The inactivation kinetics by HPLC of a liquid waste comprising 20 mg/mL imatinib mesylate aqueous solution was evaluated using a 1% hypochlorous acid aqueous solution as inactivation chemical agent, as illustrated in FIGS. 2 and 3. It is possible to verify that 10 minutes of exposure were enough for complete inactivation of imatinib mesylate by hypochlorous acid.

The equipment used was a High-Performance Liquid Chromatography-HPLC, Agilent Tech. Model 1260.

Analytical Method:
Solution A: Prepare a mixture of methanol and acetonitrile (300:200) and homogenize.
Mobile Phase: transfer 1.65 g of sodium dihydrogen phosphate dihydrate to a beaker. Dissolve in 550 mL of purified water and adjust pH to 8.0±0.2 using trimethylamine and homogenize. Add 450 mL of solution A, homogenize and filter using a membrane of 0.45 μm.

Chromatographic Conditions:
Column: Develosil ODS HG-5 (4.6×150 mm, 5 μm)—Phenomenex
Flow: 1.0 mL/min.
UV Detector: 230 nm
Injection volume: 20 μL
Column temperature: 30° C.
Chromatographic time: 50 minutes
Retention time for imatinib: about 18 minutes
Sample temperature: 5° C.

Example 2

Inactivation Kinetics

Figure 4:
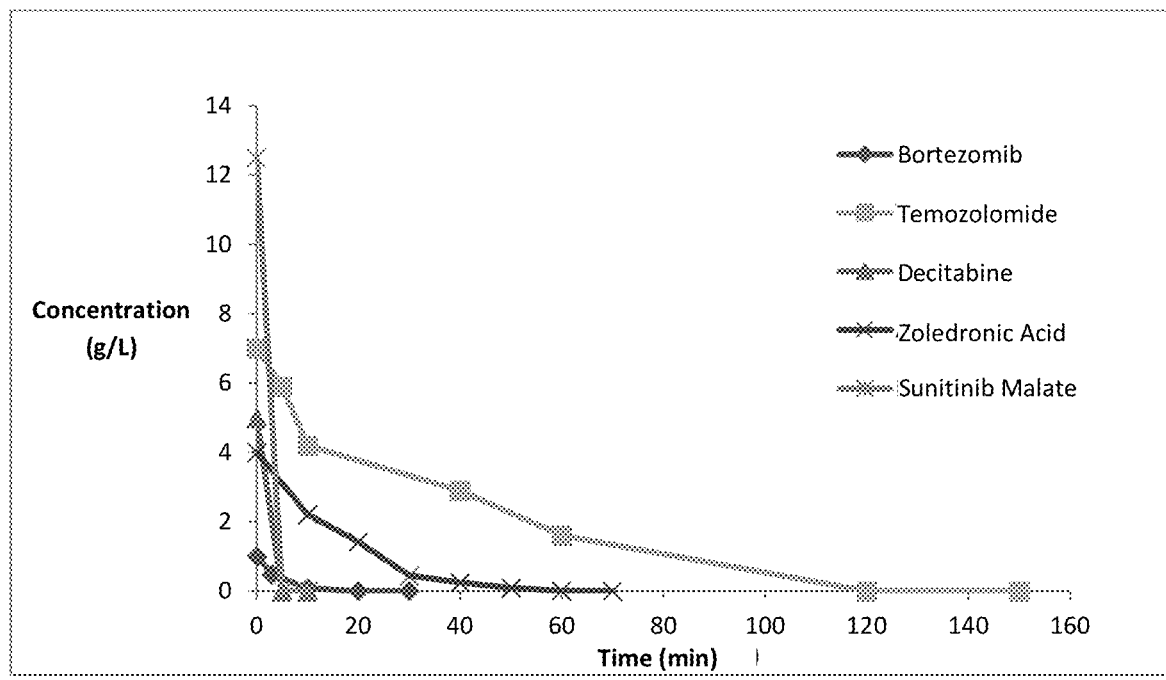
FIG. 4 illustrates inactivation kinetics of high potency APIs bortezomib, decitabine, sunitinib malate, temozolomide and zoledronic acid.

The inactivation kinetics by HPLC of high potency APIs bortezomib, decitabine, sunitinib malate, temozolomide and zoledronic acid was evaluated using chemical agents and analytical methods appropriate for each API. FIG. 4 illustrates the inactivation kinetics of these APIs and it was possible to verify that the evaluated APIs are completely inactivated by chemical agent action in different exposure time.

The invention claimed is:

1. An industrial system for inactivation of liquid waste produced by a production process of an active pharmaceutical ingredient production plant that is contaminated by mutagenic, genotoxic and/or teratogenic substances comprising:
   a first, closed pipeline configured to convey a contaminated liquid waste from the production plant; two storage tanks made of refractory steel and configured to receive the contaminated liquid waste from the closed pipeline, a mechanical filter, two inactivation tanks made of refractory steel configured to support a chemical reaction for inactivating mutagenic, genotoxic and/or teratogenic substances in the liquid waste, a plurality of tanks made of polypropylene fiber; a collector box; a plurality of collector tanks; wherein
   (a) the first pipeline is configured to displace, under control, a contaminated liquid waste from the production plant to inside of the two storage tanks;
   (b) the mechanical filter is placed between the storage tanks and inactivation tanks and is configured to retain solid wastes and particles arising from the production process or during transfer of the liquid waste;
   (c) the inactivation tanks are configured to receive contaminated liquid waste from the mechanical filter and to receive an inactivation chemical agent selected from the group consisting of strong inorganic oxidant, an acid, a base, water and mixtures thereof from an input line connected to the tanks made of polypropylene fiber;
   (d) the tanks made of polypropylene fiber are configured to receive the inactivation chemical agent by manual loading;
   (e) the collector tanks are configured to receive inactivated liquid waste comprising organic solvent solutions from the inactivation tanks, and connected to a second pipeline to transfer the inactivated liquid waste comprising water content 80% to a chemical and biological treatment plant;
   (f) the collector box is arranged in respect to all of (a)-(e) and configured to collect possible leakage of contaminated or partially inactivated liquid waste from any of (a)-(e);

wherein the above-mentioned storage and inactivation tanks are kept under inert atmosphere and reduced pressure, and the system is closed.

2. The system according to claim 1 wherein the first pipeline is made of double containment pipes and solvent resistant material.

3. The system according to claim 1, wherein the storage tanks comprise: i) two inputs located at the top, one input configured to receive nitrogen and one input configured to receive contaminated liquid waste, and one gas output at the top configured for atmospheric control; and ii) at the bottom, one output configured for transferring contaminated liquid waste to the inactivation tanks; and iii) control valves configured for operating the inputs and outputs.

4. The system according to claim 1, wherein the inactivation tanks comprise: i) six inputs at the top, four configured to receive inactivation chemical agents, one configured to receive nitrogen and one configured to receive the contaminated liquid waste, and one gas output configured for atmospheric control; ii) at the bottom, one output configured to expel inactivated liquid waste, and iii) control valves configured for operating the inputs and outputs.

5. The system according to claim 1, wherein the storage tanks and inactivation tanks each have capacity from 50 L to 1000 L.

6. The system according to claim 1, wherein the tanks made from polypropylene fiber each have capacity from 5 L to 50 L.

7. The system according to claim 1, further comprising two centrifugal pumps configured to pump the contaminated liquid waste, in a controlled amount, to inactivation tanks via the mechanical filter.

8. The system according to claim 1, further comprising four pneumatic metering pumps configured to pump, in a controlled amount, the inactivation chemical agent from the polypropylene tanks to the inactivation tanks.

9. The system according to claim 1, further comprising two centrifugal pumps configured to pump, in a controlled amount, the inactivated liquid waste to the collector tanks when the inactivated liquid waste comprises organic solvent solutions, or to a chemical and biological treatment plant when the inactivated liquid waste comprises water in an amount ≥80%.

10. The system according to claim 1, further comprising a pneumatic pump configured to pump, in a controlled amount, liquid waste from collector box to the storage tanks.

11. The system according to claim 1, further comprising an automated control system.

12. The system according to claim 1, wherein the inert atmosphere is nitrogen.

13. The system according to claim 1, wherein the contaminated liquid waste comprises organic solvent solutions and/or waste water containing mutagenic, genotoxic and/or teratogenic substances arising from production of an active pharmaceutical ingredient.

14. The system according to claim 1, wherein the active pharmaceutical ingredient is selected from the group consisting of imatinib mesylate, bortezomib, decitabine, sunitinib malate, temozolomide and zoledronic acid.

15. The system, according to claim 1, wherein the inactivation chemical agent comprises a strong inorganic oxidant selected from the group consisting of sodium hypochlorite, hypochlorous acid, hydrogen peroxide, potassium permanganate and Fenton's reagent.

16. The system, according to claim 1, wherein the inactivation chemical agent comprises hydrobromic acid or sodium hydroxide.

17. An industrial process for inactivation of liquid wastes contaminated by mutagenic, genotoxic and/or teratogenic substances arising from production of an active pharmaceutical ingredient using the inactivation system of claim 1, comprising:
(a) transferring the contaminated liquid waste to the storage tanks;
(b) pumping the contaminated liquid waste to the inactivation tanks through the mechanical filter;
(c) pumping a calculated amount of at least one inactivation chemical agent selected from the group consisting of strong inorganic oxidant, an acid, a base, water and mixtures thereof from one or more of the polypropylene tanks to the inactivation tanks;
(d) carrying out the inactivation chemical reaction between at least one inactivation chemical agent and the contaminated liquid waste inside the inactivation tanks;
(e) collecting a sample of the inactivated liquid waste and confirming the inactivation by physico-chemical and mutagenic tests;
(f) pumping the inactivated liquid waste to the collector tanks when the inactivated liquid waste comprises organic solvent solutions, or to a chemical and biological treatment plant when the liquid waste comprises water in an amount ≥80%.

18. The process according to claim 17, wherein the contaminated liquid waste comprises organic solvent solutions and/or waste water containing teratogenic, mutagenic and/or genotoxic substances arising from production of an active pharmaceutical ingredient.

19. The process according to claim 17, wherein the active pharmaceutical ingredient is selected from the group consisting of imatinib mesylate, bortezomib, decitabine, sunitinib malate, temozolomide and zoledronic acid.

20. The process according to claim 17, wherein the inactivation chemical agent comprises a strong inorganic oxidant selected from the group consisting of sodium hypochlorite, hypochlorous acid, hydrogen peroxide, potassium permanganate and Fenton's reagent.

21. The process according to claim 17, wherein the inactivation chemical agent comprises hydrobromic acid or sodium hydroxide.

22. The process according to claim 17, wherein the physico-chemical test is a chromatographic test and the mutagenic test is an AMES test.

23. The process according to claim 17, further comprising a step of treating the inactivated liquid waste to recover an organic solvent or to reduce total organic carbon.

* * * * *